(12) United States Patent
Kudo et al.

(10) Patent No.: US 10,476,710 B2
(45) Date of Patent: Nov. 12, 2019

(54) EQUALIZER CIRCUIT, RECEIVER CIRCUIT, AND INTEGRATED CIRCUIT DEVICE

(71) Applicant: SOCIONEXT INC., Yokohama-shi, Kanagawa (JP)

(72) Inventors: Masahiro Kudo, Yokohama (JP); Daisuke Suzuki, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 16/209,616

(22) Filed: Dec. 4, 2018

(65) Prior Publication Data

US 2019/0109738 A1    Apr. 11, 2019

Related U.S. Application Data

(63) Continuation of application No. PCT/JP2016/068926, filed on Jun. 24, 2016.

(51) Int. Cl.
*H04L 25/08* (2006.01)
*H04B 3/06* (2006.01)
(Continued)

(52) U.S. Cl.
CPC ............... *H04L 25/08* (2013.01); *H04B 3/06* (2013.01); *H04L 25/03057* (2013.01);
(Continued)

(58) Field of Classification Search
CPC ............ H04L 25/03057; H04L 7/0058; H04L 25/03885; H04L 2025/0349;
(Continued)

(56) References Cited

U.S. PATENT DOCUMENTS 7,564,900 B1 *   7/2009   Roo .................. H04L 25/03057
                                                    375/229
2009/0232196 A1   9/2009   Sunaga et al.
(Continued)

FOREIGN PATENT DOCUMENTS

JP    2001-44895 A     2/2001
JP    2007-515130 A    6/2007
(Continued)

OTHER PUBLICATIONS

International Search Report issued in corresponding PCT Application No. PCT/JP2016-068926 dated Aug. 16, 2016.
(Continued)

*Primary Examiner* — Leila Malek
(74) *Attorney, Agent, or Firm* — Arent Fox LLP

(57) ABSTRACT

An equalizer circuit includes a first adder circuit adding an input signal and including an addition terminal and a subtraction terminal; a comparator circuit comparing an output signal of the first adder circuit; a latch circuit latching data output from the comparator circuit; a first digital/analog converter circuit which outputs a first signal corresponding to an absolute value of an equalizing coefficient, when the equalizing coefficient is a positive value; a second digital/analog converter circuit which outputs a second signal corresponding to an absolute value of the equalizing coefficient, when the equalizing coefficient is a negative value; and a switch circuit which switches a connection between a set of an output terminal of the first digital/analog converter circuit, an output terminal of the second digital/analog converter circuit, and a set of the addition terminal and the subtraction terminal, based on the data latched in the latch circuit.

17 Claims, 7 Drawing Sheets

(51) Int. Cl.
  *H04L 25/03* (2006.01)
  *H04L 7/00* (2006.01)

(52) U.S. Cl.
  CPC .. *H04L 25/03885* (2013.01); *H04L 25/03949* (2013.01); *H04L 7/0058* (2013.01); *H04L 2025/0349* (2013.01); *H04L 2025/03681* (2013.01)

(58) Field of Classification Search
  CPC . H04L 2025/03681; H04L 2025/03808; H04L 25/03949; H04L 25/08
  USPC ........................................................ 375/233
  See application file for complete search history.

(56) References Cited

U.S. PATENT DOCUMENTS

2011/0121867 A1   5/2011   Feng
2015/0280948 A1   10/2015   Nakao
2017/0019275 A1*  1/2017   Norimatsu ............. H04L 25/03

FOREIGN PATENT DOCUMENTS

| | | |
|---|---|---|
| JP | 2009-225018 A | 10/2009 |
| JP | 2015-192200 A | 11/2015 |
| WO | WO 2005/060193 A | 6/2005 |
| WO | WO 2015/125282 A1 | 8/2015 |

OTHER PUBLICATIONS

Written Opinion of the International Searching Authority issued in corresponding PCT Application No. PCT/JP2016-068926 dated Aug. 16, 2016.

* cited by examiner

EQUALIZER CIRCUIT, RECEIVER CIRCUIT, AND INTEGRATED CIRCUIT DEVICE

CROSS-REFERENCE TO RELATED APPLICATIONS

This application is a continuation application and is based upon PCT/JP2016/068926, filed on Jun. 24, 2016, the entire contents of which are incorporated herein by reference.

FIELD

Embodiments discussed herein relate to an equalizer circuit, a receiver circuit, and an integrated circuit device.

BACKGROUND

Recently, in signal transmission among integrated circuit devices (LSI: Large-Scale Integrated circuits) mounted on a board (printed board) or signal transmission between boards over a network or signal transmission among blocks or systems, for example, a gigabit SerDes (Serializer/Deserializer) has been used. This SerDes is, for example, used to convert low speed parallel data into high speed serial data in a signal transmission side, the high speed serial data being transferred to a signal reception side via a signal line, and used to convert the high speed serial data into low speed parallel data in the signal reception side, etc., the converted low speed parallel data being processed in the signal reception side.

For example, in the case of receiving a serial signal via a transmission line such as a board wiring or a communication cable, etc., a pulse having a length of a period of a code (symbol) is temporally dispersed. Specifically, for example, in a high-speed signal transmission exceeding a few GBps (Giga Bit per second), the pulse having a symbol period is temporally dispersed by the band limitation of the transmission line, and an interference may be caused in subsequent symbols. This phenomenon has been known as an inter-symbol interference (ISI), and a decision feedback equalizer (DFE) may be used to increase an accuracy of the signal transmission (signal reception) by decreasing the ISI.

Conventionally, the various techniques have been proposed to enable the high speed signal transmission by reducing the influence of the inter-symbol interference. However, for example, various factors of causing a delay may be remained in an inter-symbol interference removal unit of the DFE, and therefore it is difficult to realize a further speed up required for the high speed signal transmission in recent years.

Incidentally, in the prior art, various techniques have been proposed to enable a high speed signal transmission by reducing an influence of the inter-symbol interference (inter-code interference).

Patent Document 1: Japanese Laid-open Patent Publication No. 2015-192200
Patent Document 2: International Publication No. WO 2015/125282
Patent Document 3: Japanese Laid-open Patent Publication No. 2001-044895

SUMMARY

According to an aspect of the embodiments, there is provided an equalizer circuit including a first adder circuit configured to add an input signal and including an addition terminal and a subtraction terminal, a comparator circuit configured to compare an output signal of the first adder circuit, a latch circuit configured to latch data output from the comparator circuit, first and second digital/analog converter circuits, and a switch circuit.

The first digital/analog converter circuit is configured to output a first signal corresponding to an absolute value of an equalizing coefficient, when the equalizing coefficient is a positive value, and the second digital/analog converter circuit is configured to output a second signal corresponding to an absolute value of the equalizing coefficient, when the equalizing coefficient is a negative value.

The switch circuit is configured to switch a connection between a set of an output terminal of the first digital/analog converter circuit, an output terminal of the second digital/analog converter circuit, and a set of the addition terminal and the subtraction terminal, based on the data latched in the latch circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
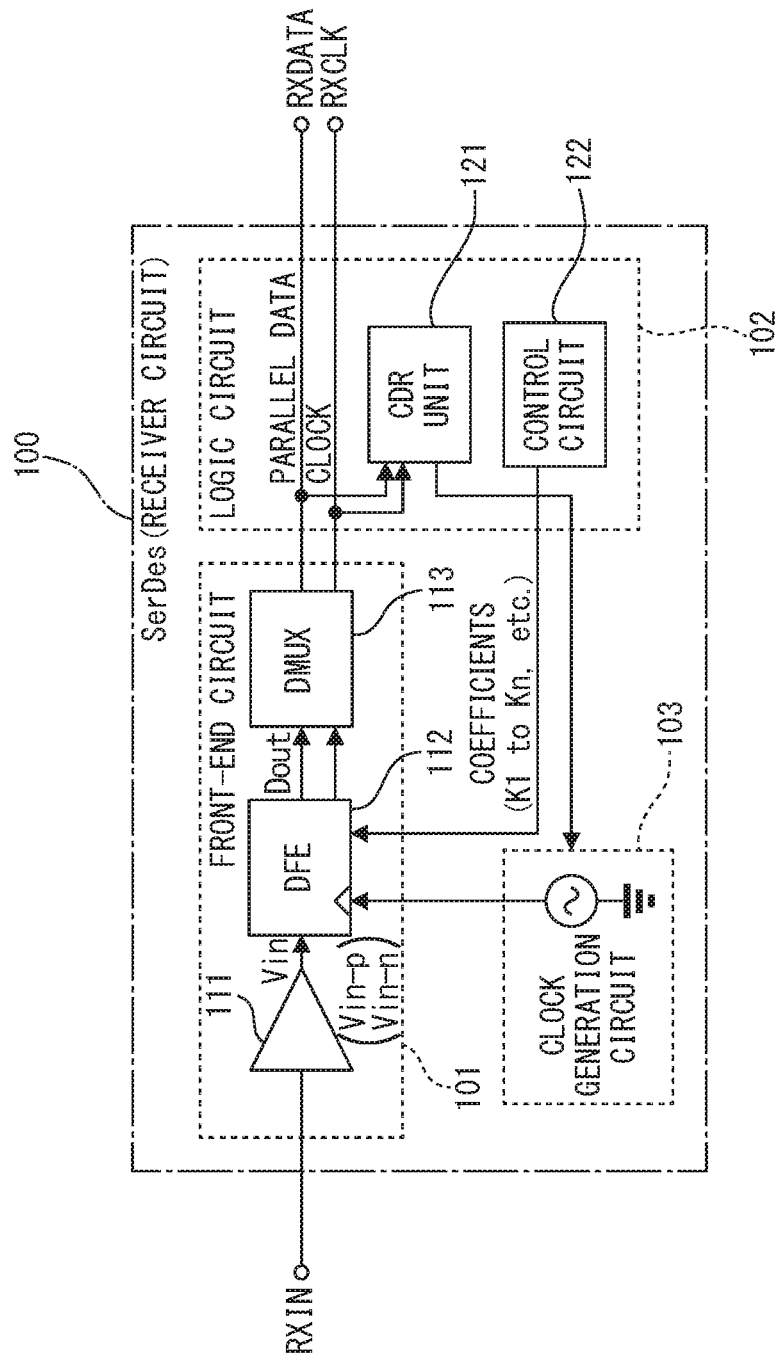
FIG. 1 is a block diagram depicting an example of a receiver circuit applying a SerDes.

First, before describing embodiments of an equalizer circuit, a receiver circuit and an integrated circuit device, an example of an equalizer circuit, a receiver circuit and an integrated circuit device, an example of the equalizer circuit, receiver circuit and integrated circuit and problems thereof will be described with reference to FIG. 1 to FIG. 5. FIG. 1 is a block diagram depicting an example of a receiver circuit applying a SerDes (Serializer/Deserializer).

As depicted in FIG. 1, for example, a receiver circuit 100 applying a SerDes receives and processes a serial signal (serial data) RXIN input via a transmission line, and outputs a parallel data RXDATA and a clock RXCLK. The receiver circuit 100 includes a front-end circuit 101, a logic circuit 102 and a clock generation circuit 103.

The front-end circuit 101 includes an amplifier circuit 111, a decision feedback equalizer (DFE) and a demultiplexer (DMUX) 113. The amplifier circuit 111 amplifies the serial signal RXIN input thereto, and outputs to the DFE (equalizer) 112. The DFE 112 receives the amplified serial signal (Vin, Vin-p, Vin-n), determines 0 and 1 of data, and outputs the determined data (Dout) accompanied with a clock to the DMUX 113 subsequent to the DFE 112.

The DMUX 113 receives the data and clock from the DFE 112, performs a serial/parallel conversion, and outputs a divided receive clock RXCLK and received parallel data RXDATA synchronized with the receive clock RXCLK. Further, an output signal of the front-end circuit 101 is input to a clock data recovery (CDR) unit 121 of the logic circuit 102.

The CDR unit (CDR logic circuit) 121 performs a timing control of the clock based on the output signal of the front-end circuit 101 (received data), generates a data capture clock via the clock generation circuit 103, and outputs the data capture clock to the DFE 112. The DFE 112 performs a sampling of the input serial data by a preferable timing, and performs the above described determination of 0 and 1 of the data. Note that, control signals (equalizing coefficients K1 to Kn, etc.) for driving the DFE as an equalizer circuit may be generated by a control circuit 122 in the logic circuit 102, but it is also possible to provide the control signals from an external.

Figure 2:
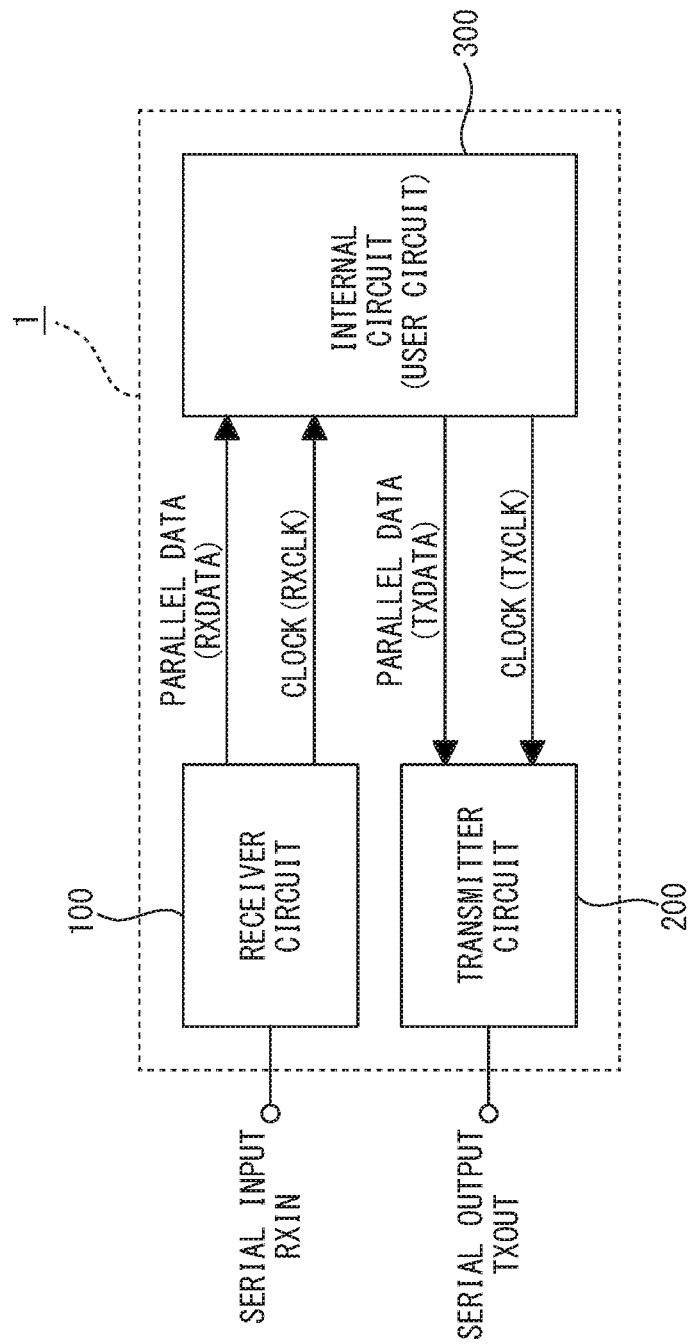
FIG. 2 is a block diagram depicting an example of an integrated circuit device applying the receiver circuit depicted in FIG. 1.

FIG. 2 is a block diagram depicting an example of an integrated circuit device applying the receiver circuit depicted in FIG. 1. As depicted in FIG. 2, an integrated circuit device (semiconductor chip) 1 includes a receiver circuit 100, a transmitter circuit 200 and an internal circuit (user circuit) 300. The receiving circuit 100 is the same as that described with reference to FIG. 1, and receives the serial signal RXIN and performs a serial/parallel conversion, and outputs the received parallel data RXDATA and the receive clock RXCLK to the internal circuit 300. The transmitter circuit 200 receives transmit parallel data TXDATA and a transmit clock TXCLK output from the internal circuit 300, performs a parallel/serial conversion, and outputs a serial signal TXOUT.

Specifically, the receiver circuit 100 converts input high speed (e.g., several tens of GHz or higher) serial data RXIN into low speed (e.g., lower than 1 GHz) parallel data RXDATA which may be processed by the internal circuit 300, and outputs the converted parallel data RXDATA to a transmission line. Further, the transmitter circuit 200 converts low speed (e.g., lower than 1 GHz) parallel data TXDATA output from the internal circuit 300 into high speed (e.g., several tens of GHz or higher) serial data TXOUT, and outputs the converted serial data TXOUT to the transmission line.

Note that the integrated circuit device, for example, transmits and receives high-speed serial data via board wirings to and from other integrated circuit devices mounted on the same substrate. Further a first system (block) including an integrated circuit device is, for example, separated by a predetermined distance (e.g., several cm to several km) from a second system including another integrated circuit device, and high speed serial data transmission and reception may be performed between the first and second devices via a communication cable. Incidentally, the application of the integrated circuit device is not limited above, but the integrated circuit device may be widely applied.

Further, in FIG. 2, the integrated circuit device 1 includes the internal circuit 300 accompanied with the receive circuit 100 and the transmitter circuit 200, however, the integrated circuit device 1 may be provided as an I/O (Input/Output) chip including both the receive circuit 100 and the transmitter circuit 200. In addition, it may be possible to provide various forms such as only the receiver circuit 100, only the transmitter circuit 200, and an IP (Intellectual Property) macro constituted by a plurality of receiver circuits 100 and transmitter circuits 200.

Incidentally, a pulse including a length of a period of a symbol (code) of the serial signal is, for example, temporally dispersed, by a band limitation of a transmission line (boar wiring, communication cable, etc.) where signals are transmitted from a transmitter circuit 200 of an optional integrated circuit device 1 to a receiver circuit 100 of another integrated circuit device 1. Specifically, in a high-speed signal transmission, a pulse including a symbol period is temporally dispersed, and an interference may be caused in subsequent symbols. This phenomenon is known as an inter-symbol interference (ISI). Here, a circuit including a function of increasing a transmission (reception) signal accuracy by removing (reducing) the ISI is referred as an equalizer circuit, and the DFE 112 described above is an example of the equalizer circuit.

Specifically, the ISI applied to symbols at a specific timing (current timing) is determined based on a previous (past) symbol sequence. Here, the DFE (decision feedback equalizer) is used to add determination results of past symbol sequences by weighting respective magnitudes of influences of previous symbols, obtains an estimated value for removing the ISI, subtracts the estimated value from the input signal, and performs a determination by using the comparator circuit.

Figure 3:
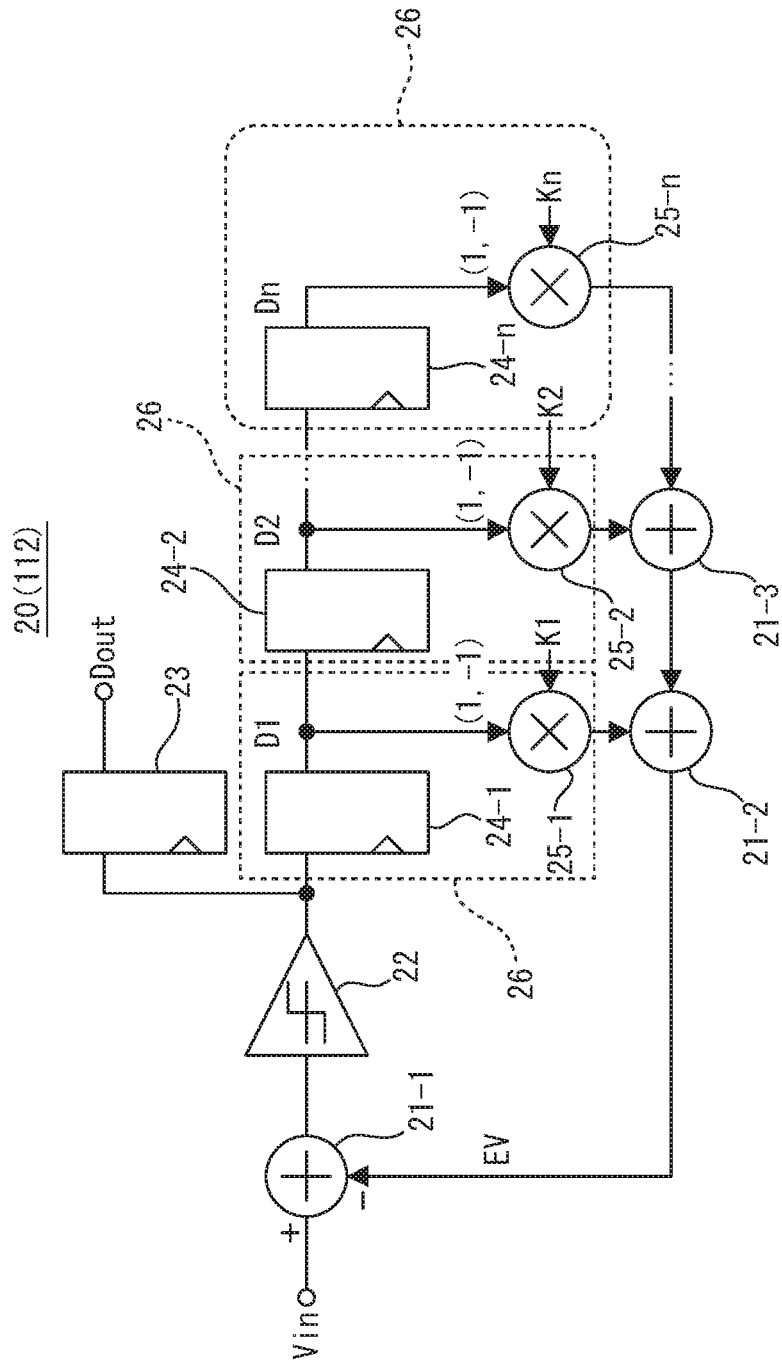
FIG. 3 is a block diagram depicting an example of a DFE in the receiver circuit depicted in FIG. 1.

FIG. 3 is a block diagram depicting an example of a DFE in the receiver circuit depicted in FIG. 1, and the DFE handles a serial signal of binary single-ended signal (e.g., NRZ (Non-Return-to-Zero) signal). The DFE 20 (112) depicted in FIG. 3 may be called as an n taps (n-tap) DFE for removing (compensating) the influences of the ISI due to previous n symbols from a current symbol. Here, n is an integer of 1 or more, equalizing coefficients K1 to Kn may be set to various values based on, for example, characteristics of a signal line where an input serial signal Vin is transmitted. Note that, for example, the equalizing coefficients K1 to Kn may be set to fixed values based on characteristics of a signal line where the serial signal RXIN is transmitted or set to fixed values based on periodically measuring characteristics of the signal line. Alternatively, for example, the equalizing coefficients K1 to Kn may be dynamically set to values based on characteristics until receiving an immediate preceding symbol by measuring in real time.

As depicted in FIG. 3, the DFE 20 includes a comparator circuit 22, a flip-flop 23 for holding an output signal (current symbol), n flip-flops 24-1 to 24-n which hold past n symbols, and multiplexer circuits 25-1 to 25-n. Furthermore, the DFE 20 includes n adder circuits (summers) 21-1 to 21-n. Here, in each stage, a configuration including the respective flip-flops 24-1 to 24-n and the multiplexer circuits 25-1 to 25-n is constituted as an inter-symbol interference removal unit (latch circuit+DAC (digital/analog converter)) 26. Therefore, in the n-tap DFE 20, n inter-symbol interference removal units 26 may be included. Note that, flip-flops (latch circuits) 24-1 to 24-n in respective inter-symbol interference removal unit 26 are connected in series and functioned as a shift register for holding data until past n-th previous symbols. The flip-flop (latch circuit) 23 holds an output signal of the comparator circuit 22, and outputs to an external (e.g., DMUX 113 depicted in FIG. 1) as data Dout.

The adder circuit 21-1 adds together inter-symbol interferences (subtracts an estimated value EV) due to past n data caused by n inter-symbol interference removal units 26 to an input signal Vin, and removes influence of inter-symbol interferences of the past n data. Note that, in FIG. 3, an output signal of each of the inter-symbol interference removal units 26 is sequentially added by a preceding adder circuit 21-2, 21-3, . . . , however, the features thereof are not limited to such a configuration.

Specifically, as depicted in FIG. 3, in the DFE 20, the estimated value EV of the ISI (sum of past n data caused by n inter-symbol interference removal units 26) is subtracted from the serial signal Vin input from the external by the adder circuit 21-1. Further, an output signal of the adder circuit 21-1, where interference of the ISI may be removed (reduced), is sampled and quantized by the comparator circuit 22, and is output as output data (digital data) Dout via the flip-flop 23. Note that, as described with reference to FIG. 1, the output data Dout of the DFE 20 (112) is input to a subsequent DMUX (113), and wherein serial/parallel conversion or the like may be performed.

Further, as depicted in FIG. 3, an output signal of the comparator circuit 22 is input to a first flip-flop 24-1 of the n flip-flops 24-1 to 24-$n$ which are connected in series. Here, the flip-flops 24-1 to 24-$n$ fetch data, for example, in synchronization with a determined symbol clock (data sampling clock), and constitute an n-bit shift register. Therefore, the flip-flops 24-1 to 24-$n$ hold data of the last n symbols. Specifically, in the n taps DFE20 depicted in FIG. 3, the number of data used for the ISI estimation (number past symbols) is n, and the ISI caused by n unit intervals (UI: 1 symbol time which is defined by a reciprocal of a baud rate) may be removed.

Figure 4:
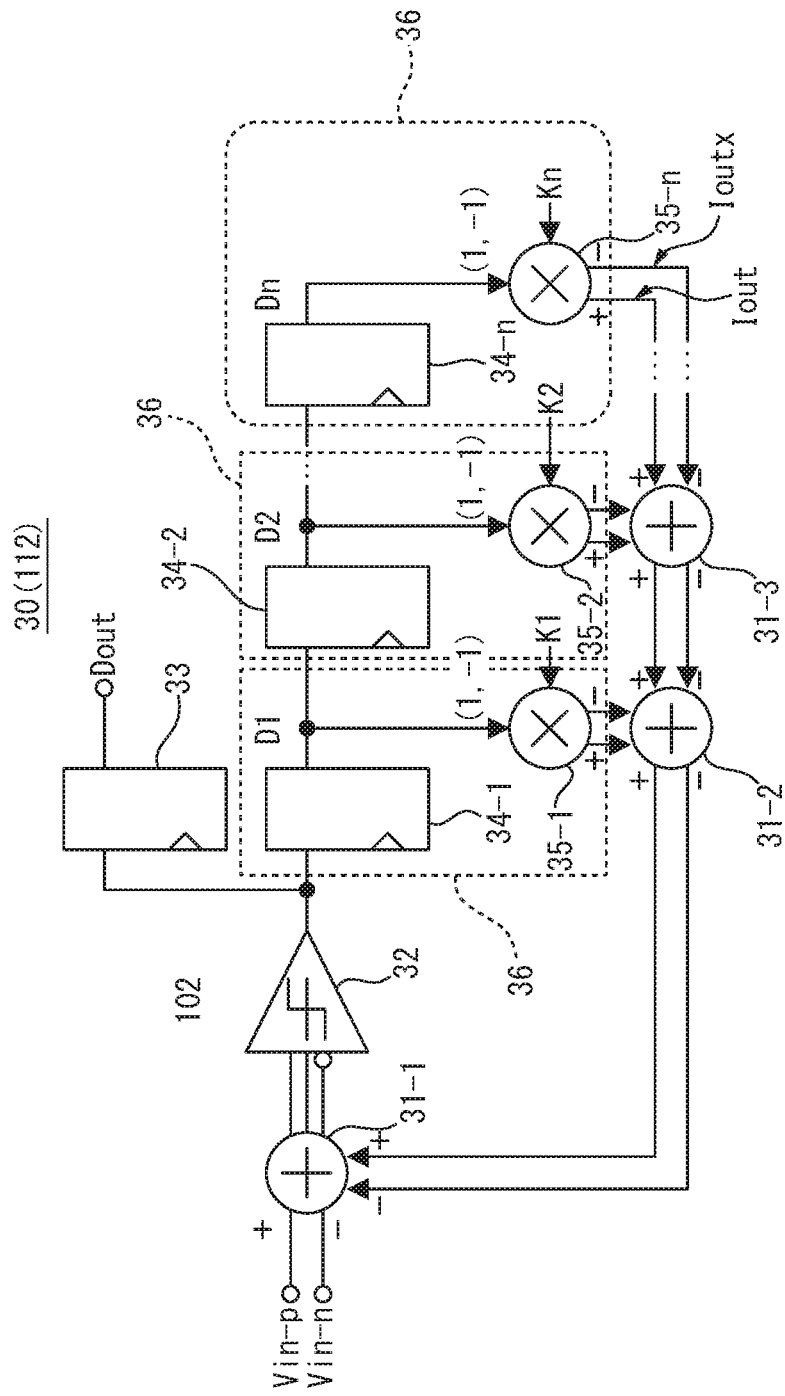
FIG. 4 is a block diagram depicting another example of the DFE in the receiver circuit depicted in FIG. 1.

FIG. 4 is a block diagram depicting another example of the DFE in the receiver circuit depicted in FIG. 1, and corresponds to a DFE30 handling a differential (complementary) signal instead of the single-ended signal handled by the DFE20 depicted in FIG. 3. Specifically, as is apparent from a comparison between FIG. 4 and FIG. 3, the DFE 30 (112) depicted in FIG. 4 is a n-tap DFE and includes a substantially same structure of the DFE20 depicted in FIG. 3.

Next, calculation of an estimated value of the ISI will be explained. First, in the case of an NRZ signal, a determination result of the comparator circuit 22 (32) is a binary 0 or 1, typically corresponding to a voltage of a minus (−) or an plus (+) state of a voltage of the serial signal Vin. For example, in the DFE 20 handling the single-ended signal depicted in FIG. 3, the sign is considered as a sign of an input signal against the signal ground, and in the DFE 30 handling the differential signal depicted in FIG. 4, the sign is considered as a sign of the differential signal.

Further, so as to estimate a magnitude of the ISI influencing to a determination of current symbol by the past symbols, in the n-tap DFE 20 (30), for each of coefficients K1, . . . , Kn, which represents the influence of the past data, for example, −1 is made to correspond to data 0 and +1 is made to correspond to data 1. In the multiplexer circuits 25-1 to 25-$n$ (35-1 to 35-$n$), for the coefficients K1, . . . , Kn input thereto, the data 0 is multiplied by a sign of −1 and the data 1 is multiplied by a sign of +1 (positive), and are wholly integrated by the adder circuits 21-1 to 21-$n$ (31-1 to 31-$n$). Specifically, outputs of respective inter-symbol interference removal units 26 (36) are gathered and added to the input signal Vin (Vin-p, Vin-n) by the adder circuit 21-1 (31-1). Incidentally, when output signals of the multiplexer circuits 25-1 to 25-$n$ (35-1 to 35-$n$) are current signals, output lines from respective output terminals of the multiplexer circuits 25-1 to 25-$n$ (35-1 to 35-$n$) may be physically connected to input lines of corresponding terminals of the adder circuit 21-1 (31-1), for example, without providing dedicated adder circuits when the output signals are voltage signals.

In this way, by subtracting the ISI due to past symbols weighted by equalizing coefficients K1, . . . , Kn from the input serial signal Vin (Vin-p, Vin-n), it may be possible to remove (reduce) an influence of the ISI caused by the past symbols. Here, signals input to the adder circuits 21-1 to 21-$n$ (31-1 to 31-$n$) are typically analog signals used as current or voltage signals, and DACs (multiplexer circuits 25-1 to 25-$n$ (35-1 to 35-$n$)) may be used to output analog signals based on the coefficients K1, K2, . . . , Kn. Note that, in the DFE30 depicted in FIG. 4, output signals of the adder circuits 31-1, 31-2, . . . and the DACs 35-1, 35-2, . . . may be differential signals, and an amplitude (signal amplitude) of the differential signal may be represented by a difference between a pair of signals. Specifically, switching the sign of the differential signal may be realized by changing the differential signal from each other, and therefore a differential signal may be generally applied to an electronic circuit.

Figure 5:
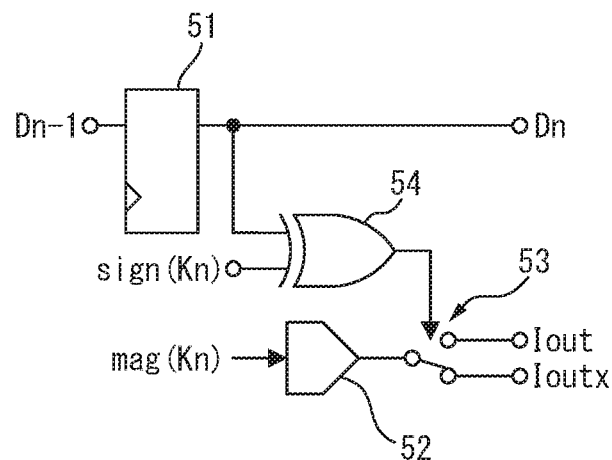
FIG. 5 is a block diagram depicting an example of an inter-symbol interference removal unit in the DFE depicted in FIG. 4.

FIG. 5 is a block diagram depicting an example of an inter-symbol interference removal unit in the DFE depicted in FIG. 4. As depicted in FIG. 5, the inter-symbol interference removal unit 5 (36) includes a latch circuit (flip-flop) 51, a DAC (digital/analog converter) 52, a switch circuit 53, and an exclusive OR circuit (XOR gate) 54. In the following descriptions, assuming the DAC as a current DAC, the analog signal as a differential current signal (e.g., an output signal of the switch circuit is a differential current output signal Iout, Ioutx). Nevertheless, it may be possible to apply a voltage signal and a single-ended signal.

The flip-flop 51 is a delay circuit used to delay (and hold) a preceding data Dn−1 and output as an output data Dn, The XOR gate 54 performs an exclusive OR of the output data Dn and code information sign(Kn) of the equalizing coefficient Kn. Note that, in the code information sign(Kn) of the equalizing coefficient Kn, for example, data 0 indicates that the sign is positive, and data 1 indicates that the sign is negative. The current DAC 52 receives absolute value information mag(Kn) of the equalizing coefficient Kn, and output a corresponding signal to the switch circuit 53. The switch circuit 53 selects an output of the current DAC 52 based on the output of the XOR gate 54, and output as a current output signal Iout or Ioutx.

Therefore, the inter-symbol interference removal unit 5 (36) depicted in FIG. 5 processes the output data Dn and the code information sign(Kn) of the equalizing coefficient Kn by using the XOR gate 54, and obtains a multiplication result as their codes. Further, an output of the current DAC 52, which outputs the absolute value information mag(Kn) of the equalizing coefficient Kn as a current signal, is connected to the switch circuit 53 for selecting one of two output terminals, and an output signal of the XOR gate 54 is used as a control signal of the switch circuit 53. The two output terminals (current signal Iout, Ioutx) of the switch circuit 53 are connected to, for example, addition terminals (+) and subtraction terminals (−) of the adder circuits 31-2, 31-3, . . . depicted in FIG. 4 as described above. Specifically, the switch circuit 53 selects whether a current signal output from the current DAC 52 to one of terminals (+, −) of the adder circuits 31-2, 31-3, . . . , so that a sign of the current output applied to the adder circuits 31-2, 31-3, . . . is changed.

Therefore, the current signal Iout is, for example, grouped with the current signal Iout of the other inter-symbol interference removal unit 36 (5), and input to the addition terminal (+) of the adder circuit 31-1. Similarly, the current signal Ioutx is, for example, grouped with the current signal Ioutx of the other inter-symbol interference removal unit 36, and input to the subtraction terminal (−) of the adder circuit 31-1. Here, the delay circuit (latch circuit) 51 is a flip-flop (D-type flip-flop) as an example, and it may be possible to replace it by a various circuit having an equivalent function.

Incidentally, the DFE (decision feedback equalizer) 30 is used to remove (reduce) influences of the ISI caused by previous symbols from input signals Vin-p, Vin-n, and perform quantization by the comparator 32, when outputs (Iout, Ioutx) of respective inter-symbol interference removal units 36 reach to the adder circuit 31-1. Therefore, a delay time due to a signal based on an output of the latch circuit 51 for holding data previously determined by the comparator circuit 32 reaches to the adder circuit 31-1 (31-2, 31-3, . . . ) is required within a time (1 UI) for determining the output of the adder circuit 31-1 by the comparator 32. Specifically, an upper limit of data rate which may be processed by the delay time is defined.

However, in the inter-symbol interference removal unit 5 (36) depicted in FIG. 5, the switch circuit 53 is controlled by an output signal of XOR gate 54 which performs an exclusive OR of the output data Dn and the code information sign(Kn) of the coefficient Kn. Specifically, in the inter-symbol interference removal unit 5, an operation delay of the XOR gate 54 defined from outputting the data Dn until outputting current signals Iout, Ioutx is included, so that an operation speed of the circuit may be limited. As the result, it has become difficult for a high-speed signal transmission of data rate, for example, several tens GBps.

Figure 6:
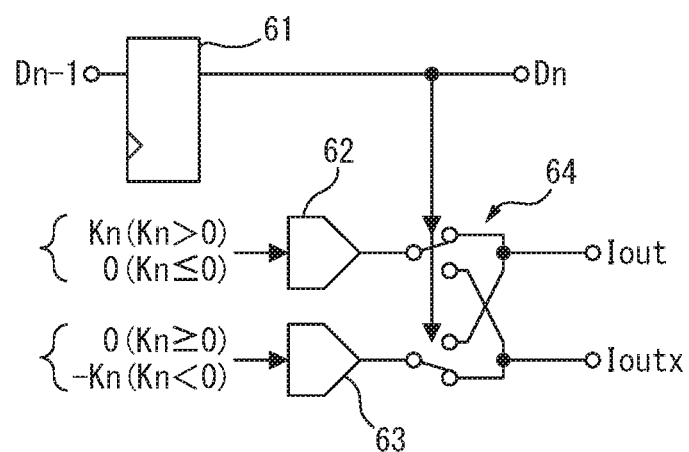
FIG. 6 is a block diagram depicting a first embodiment of an inter-symbol interference removal unit in a DFE according to the present embodiments.

Hereinafter, embodiments of an equalizer circuit, a receiver circuit and an integrated circuit device will be described in detail with reference to the accompanying drawings. FIG. 6 is a block diagram depicting a first embodiment of an inter-symbol interference removal unit in a DFE according to the present embodiments. Note that an inter-symbol interference removal unit 6 depicted in FIG. 6 is, for example, applied to the inter-symbol interference removal unit 36 depicted in FIG. 4 described above. This matter for the first embodiment may be also the same as inter-symbol interference removal units 7 and 8 of a second embodiment and a third embodiment, which will be described later.

Further, as described above, in the following descriptions, assuming a DAC as a current DAC, an analog signal as a differential current signal, however, it is of course that a voltage signal and a single-ended signal may be applied. Note that, when applying a voltage signal, features of each adder circuit (31-2, 31-3, . . . ) may be realized by applying well-known circuit configurations. Further, an equalizer circuit, a receiver circuit and an integrated circuit device of the present embodiment may be realized by applying an inter-symbol interference removal unit according to the first to third embodiments described later.

As depicted in FIG. 6, the inter-symbol interference removal unit 6 (36) includes a flip-flop (latch circuit) 61, current DACs (digital/analog converter circuits) 62, 63, and a switch circuit 64. The flip-flop 61 is used as a delay circuit which delays (and holds) a preceding data Dn−1 and outputs as an output data Dn, and the switch circuit 64 selects output signals of the current DACs 62, 63 based on the output data Dn, and outputs as a current output signal Iout or Ioutx.

When an equalizing coefficient Kn is larger than zero (Kn>0), i.e., when Kn is a positive value, the current DAC (first DAC) 62 receives information indicating Kn (absolute value of Kn), and when Kn is equal to or lower than zero (Kn 0), i.e., when Kn is a negative value or zero, the current DAC 62 receives the information indicating Kn is zero (0), and outputs a corresponding current signal (first signal), respectively. On the other hand, when the equalizing coefficient Kn is equal to or larger than zero (Kn 0), i.e., when Kn is zero or a positive value, the current DAC (second DAC) 63 receives the information indicating Kn is zero (0), and when Kn is lower than zero (Kn<0), i.e., when Kn is a negative value, the current DAC 63 receives information indicating −Kn (absolute value of Kn), and outputs a corresponding current signal (second signal), respectively. Therefore, in two current DACs 62, 63, absolute value information of Kn is supplied to one of the DACs, and information indicating the equalizing coefficient is zero (0) is supplied to the other of the DACs, in accordance with the sign of the equalizing coefficient Kn.

The switch circuit 64 receives outputs of the current DACs 62 and 63 (first signal and second signal), and selects signals to be output as current output signals Iout and Ioutx based on an output signal (Dn) of the flip-flop 61. Here, two output terminals (current signals Iout, Ioutx) of the switch circuit 64 are, for example, connected to an addition terminal (+) and a subtraction terminal (−) of the adder circuits 31-2, 31-3, . . . depicted in FIG. 4 described above. Specifically, the switch circuit 64 is adapted to switch whether current signals output from the current DACs 62 and 63 to terminals (+, −) of the adder circuits 31-2, 31-3, . . . .

Therefore, the current signals Iout are, for example, grouped with a current signal Iout of the other inter-symbol interference removal units 36 (6), and supplied to an addition terminal (+) of the adder circuit 31-1. Similarly, the current signals Ioutx are, for example, grouped with a current signal Ioutx of the other inter-symbol interference removal units 36, and supplied to a subtraction terminal (−) of the adder circuit 31-1. Note that, in the above descriptions, the delay circuit (latch circuit) 61 is explained by applying a flip-flop, however, the delay circuit may be replaced by various circuits including an equivalent function.

Here, the current DAC 62, 63 output, for example, a predetermined current value (current signal) for code information sign(Kn) of a predetermined coefficient Kn, and the switch circuit 64 is directly controlled by an output data (Dn) of the flip-flop 61. Therefore, for example, it is possible to omit the delay due to the XOR gate 54 in the inter-symbol interference removal unit 5 depicted in FIG. 5 described above, and it becomes possible to increase an operation speed (high-speed data rate) of the circuit. Note that, in the inter-symbol interference removal unit 6 of the first embodiment, the output data Dn is used to select two signals, and a circuit scale of the switch circuit depicted in FIG. 6 becomes, for example, twice of a circuit scale of the switch circuit 53 depicted in FIG. 5. Therefore, a consumption power is increased, however, no practical problem may be caused.

Figure 7:
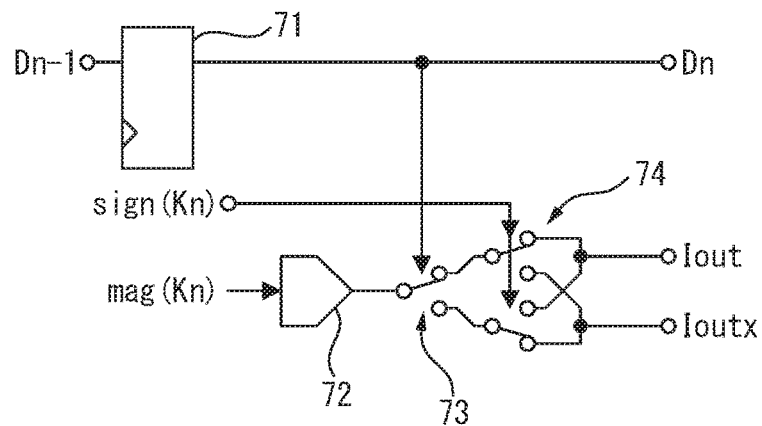
FIG. 7 is a block diagram depicting a second embodiment of the inter-symbol interference removal unit in the DFE according to the present embodiments.

FIG. 7 is a block diagram depicting a second embodiment of the inter-symbol interference removal unit in the DFE according to the present embodiments. As depicted in FIG. 7, an inter-symbol interference removal unit 7 (36) includes a flip-flop 71, a current DAC 72 and switch circuits 73, 74. The flip-flop 71 is the similar to the flip-flop 61 of the first embodiment described above, and an output data Dn controls the switch circuit (first switch circuit) 73. Note that the second switch circuit 74 is controlled based on code information sign(Kn) of an equalizing coefficient Kn.

The current DAC 72 receives absolute value information mag(Kn) of the equalizing coefficient Kn, and outputs a corresponding current signal (third signal). The first switch circuit 73 is controlled based on the output data Dn from the flip-flop 71, and an output of the first switch circuit 73 is input to the second switch circuit 74. The second switch circuit 74 selects an output of the first switch circuit 73 based on the code information sign(Kn) of the equalizing coefficient Kn, and outputs a signal as a current output signal Iout or Ioutx.

In inter-symbol interference removal unit 7 of the second embodiment, the current DAC 72 also outputs, for example, a predetermined current signal for absolute value information mag(Kn) of a predetermined coefficient Kn. Further, the first switch circuit 73 is directly controlled by the output data Dn from the flip-flop 71, and the second switch circuit 74 is controlled by the code information sign(Kn) of the predetermined coefficient Kn, Therefore, as in the first embodiment described above, for example, it may be possible to omit the XOR gate 54 in the inter-symbol interference removal unit 5 depicted in FIG. 5 described above, and also possible to increase an operation speed of the circuit. Note that, in this inter-symbol interference removal units 7 of second embodiment, two stages of switch circuits for selecting an output signal of the current DAC 72 may be provided in series. Therefore, an output level of the current DAC 72 may be reduced and an operation speed thereof may be decreased, however, no practical problem may be caused.

Figure 8:
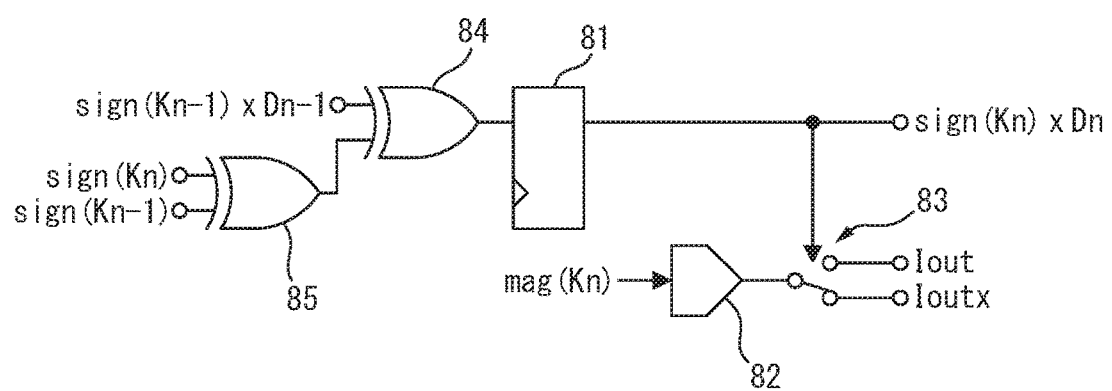
FIG. 8 is a block diagram depicting a third embodiment of the inter-symbol interference removal unit in the DFE according to the present embodiments.

FIG. 8 is a block diagram depicting a third embodiment of the inter-symbol interference removal unit in the DFE according to the present embodiments. As depicted in FIG. 8, an inter-symbol interference removal unit 8 (36) includes a flip-flop 81, a current DAC 82, a switch circuit 83 and an XOR gates 84, 85. The XOR gate (second exclusive OR circuit) 85 receives code information sign(Kn) of an equalizing coefficient for a current symbol (data Dn) and code information sign(Kn−1) of an equalizing coefficient for an immediate preceding symbol (Dn−1), and takes an exclusive OR thereof. The XOR gate (first exclusive OR circuit) 84 takes an exclusive OR of an output signal (second value) of the XOR gate 85 and a multiplication value (first value) of multiplying data Dn−1 of the immediate preceding symbol and the code information sign(Kn−1) of the equalizing coefficient Kn−1 thereof.

Specifically, the XOR gate 84 take an exclusive OR of the first value (sign(Kn−1) Dn−1) and the second value output from the XOR gate 85, and outputs to the flip-flop 81, wherein the first value is obtained by multiplying data immediate preceding symbol of an output of the comparator circuit 32 and code information of an equalizing coefficient thereof. Here, the XOR gate 85 takes, for example, an exclusive OR of code information sign(Kn) of a predetermined coefficient Kn and code information sign(Kn−1) of a coefficient Kn−1, and therefore no delay may be caused. Further, the XOR gate 85 may be possible not to internally provide into the inter-symbol interference removal unit 8, and previously performs an exclusive OR process in external, and a processed value (second value) may be input to the XOR gate 84. In addition, the first value (sign(Kn−1) Dn−1) input to the XOR gate 84 is obtained based on the immediate preceding symbol, and therefore a delay may not caused by the XOR gate 84, similar to the XOR gate 85.

The flip-flop 81 receives an input signal (output signal of XOR gate 84) and delays (and holds), and outputs a signal sign(Kn) Dn. Specifically, in the third embodiment, an output signal of the XOR gate 84, which is processed as described above, is input to the flip-flop (delay circuit) 81 without using data Dn−1 of the immediate preceding symbol different from the first and second embodiments as described above. Further, the switch circuit 83 selects an output signal (fourth signal) of the current DAC 82 based on an output signal (sign(Kn) Dn) of the flip-flop 81, and outputs as a current output signal Iout or Ioutx.

As described above, in the third embodiment, the switch circuit 83 is directly controlled by the output signal of the flip-flop 81, and therefore it is possible to eliminate a delay due to the XOR gate 54 of the inter-symbol interference removal unit 5 depicted in FIG. 5. Note that, in the inter-symbol interference removal unit 8 of the third embodiment, for example, two XOR gates 84, 85 are employed, however, these XOR gates do not provide a delay in the circuit operation. Further, in the third embodiment, the switch circuit 83 only selects one of two output terminals (Iout, Ioutx), and therefore it may not cause problems such as an increase of a consumption power in the first embodiment.

Figure 9:
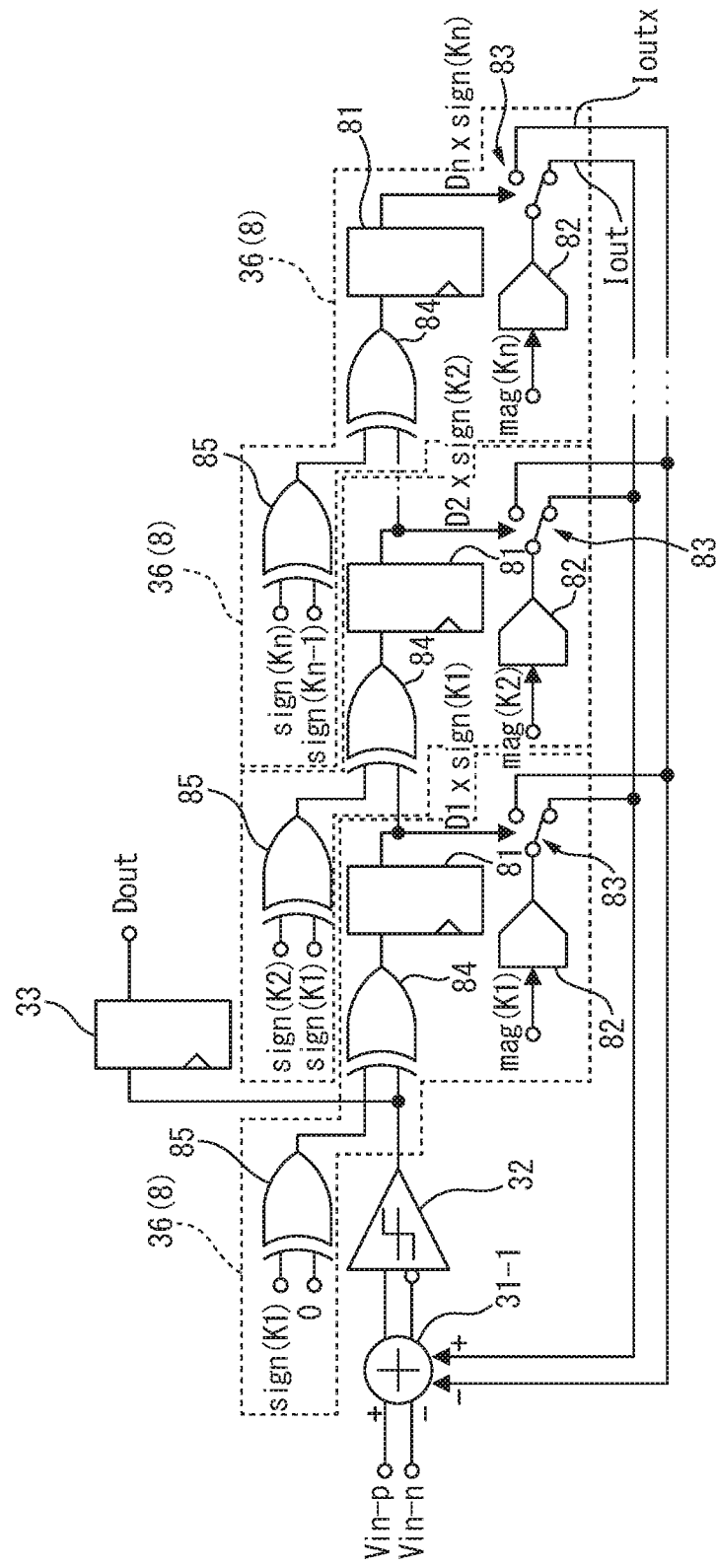
FIG. 9 is a block diagram depicting an example of a DFE applying the third embodiment of the inter-symbol interference removal unit depicted in FIG. 8.

FIG. 9 is a block diagram depicting an example of a DFE applying the third embodiment of the inter-symbol interference removal unit depicted in FIG. 8, and wherein the inter-symbol interference removal unit 8 depicted in FIG. 8 is applied to the inter-symbol interference removal unit 36 of the DFE 30 (112) depicted in FIG. 4. As depicted in FIG. 9, in each of inter-symbol interference removal units 36 (8), a current DAC 82, signals input to XOR gates 84, 85, and a control signal of a switch circuit 83 are shifted depending on corresponding symbols. Further, in FIG. 9, the DAC 82 is constituted as a current DAC, differential current output signals Iout, Ioutx from each of the inter-symbol interference removal units 36 (8) are grouped and input to an addition terminal (+) and a subtraction terminal (−) of an adder circuit 31-1, by physically connecting output lines of respective output terminals of a switch circuit 83 of each of the inter-symbol interference removal units 36 (8) to input lines corresponding to the addition terminal (+) and subtraction terminal (−) of the adder circuit 31-1. Specifically, in FIG. 9, the circuit configuration of the physical connected described above functions as an adder circuit. Note that, as described above, each of the first to third embodiments may be of course to apply, for example, to the DFE 20 processing a single-ended signal as depicted in FIG. 3, or the DFE compensating the SIS by using voltage signals.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An equalizer circuit comprising:
   a first adder circuit configured to add an input signal and including an addition terminal and a subtraction terminal;
   a comparator circuit configured to compare an output signal of the first adder circuit;

a latch circuit configured to latch data output from the comparator circuit;
a first digital/analog converter circuit configured to output a first signal corresponding to an absolute value of an equalizing coefficient, when the equalizing coefficient is a positive value;
a second digital/analog converter circuit configured to output a second signal corresponding to an absolute value of the equalizing coefficient, when the equalizing coefficient is a negative value; and
a switch circuit configured to switch a connection between a set of an output terminal of the first digital/analog converter circuit, an output terminal of the second digital/analog converter circuit, and a set of the addition terminal and the subtraction terminal, based on the data latched in the latch circuit.

2. The equalizer circuit according to claim 1, wherein
the first digital/analog converter circuit is configured to output a signal corresponding to a signal in the case of the equalizing coefficient being zero, when the equalizing coefficient is a negative value, and
the second digital/analog converter circuit is configured to output a signal corresponding to a signal in the case of the equalizing coefficient being zero, when the equalizing coefficient is a positive value.

3. The equalizer circuit according to claim 1, wherein
the first signal and second signal are a first current signal and a second current signal,
the first digital/analog converter circuit and the second digital/analog converter circuit are a first current DAC and a second current DAC.

4. The equalizer circuit according to claim 1, wherein
the equalizer circuit includes n inter-symbol interference removal units configured to remove inter-symbol interference due to past n data, where n is an integer of 2 or more,
each of the inter-symbol interference removal units includes a corresponding latch circuit, a corresponding first digital/analog converter circuit, a corresponding second digital/analog converter circuit, and a corresponding switch circuit, and
the latch circuits included in the n inter-symbol interference removal units are connected in series and constituted as a shift register for storing data of symbols up to n-th previous data.

5. A receiver circuit comprising:
the equalizer circuit according to claim 1;
a demultiplexer configured to receive data output from the equalizer circuit, perform a serial/parallel conversion, and output received parallel data accompanied with a receive clock; and
a clock generation circuit configured to generate a data sampling clock used in the equalizer circuit based on an output signal of the demultiplexer.

6. An integrated circuit device comprising:
the receiver circuit according to claim 5;
an internal circuit configured to receive the received parallel data and the receive clock from the receiver circuit, and perform processing; and
a transmitter circuit configured to receive transmit parallel data and a transmit clock from the internal circuit, perform a parallel/serial conversion, and output a serial converted transmit signal.

7. An equalizer circuit comprising:
a first adder circuit configured to add an input signal and including an addition terminal and a subtraction terminal;
a comparator circuit configured to compare an output signal of the first adder circuit;
a latch circuit configured to latch data output from the comparator circuit;
a digital/analog converter circuit configured to output a third signal corresponding to an absolute value of an equalizing coefficient; and
a switch circuit configured to switch a connection between an output terminal of the digital/analog converter circuit, and a set of the addition terminal and the subtraction terminal, based on the data latched in the latch circuit and sign information of the equalizing coefficient.

8. The equalizer circuit according to claim 7, wherein
the switch circuit includes:
a first switch circuit configured to switch a connection between the output terminal of the digital/analog converter circuit and output terminals of the first switch circuit, based on the data latched in the latch circuit; and
a second switch circuit configured to switch a connection between the output terminals of the first switch circuit, and the set of the addition terminal and the subtraction terminal, based on the sign information of the equalizing coefficient.

9. The equalizer circuit according to claim 8, wherein
the third signal is a third current signal, and
the digital/analog converter circuit is a current DAC.

10. The equalizer circuit according to claim 8, wherein
the equalizer circuit includes n inter-symbol interference removal units configured to remove inter-symbol interference due to past n data, where n is an integer of 2 or more,
each of the inter-symbol interference removal units includes a corresponding latch circuit, a corresponding digital/analog converter circuit, and a corresponding switch circuit, and
the latch circuits included in the n inter-symbol interference removal units are connected in series and constituted as a shift register for storing data of symbols up to n-th previous data.

11. A receiver circuit comprising:
the equalizer circuit according to claim 8;
a demultiplexer configured to receive data output from the equalizer circuit, perform a serial/parallel conversion, and output received parallel data accompanied with a receive clock; and
a clock generation circuit configured to generate a data sampling clock used in the equalizer circuit base on an output signal of the demultiplexer.

12. An integrated circuit device comprising:
the receiver circuit according to claim 11;
an internal circuit configured to receive the received parallel data and the receive clock from the receiver circuit, and perform processing; and
a transmitter circuit configured to receive transmit parallel data and a transmit clock from the internal circuit, perform a parallel/serial conversion, and output a serial converted transmit signal.

13. An equalizer circuit comprising:
a first adder circuit configured to add an input signal and including an addition terminal and a subtraction terminal;
a comparator circuit configured to compare an output signal of the first adder circuit;
a latch circuit configured to latch a first value based on data output from the comparator circuit;

a digital/analog converter circuit configured to output a fourth signal corresponding to an absolute value of an equalizing coefficient; and a switch circuit configured to switch a connection between an output terminal of the digital/analog converter circuit, and a set of the addition terminal and the subtraction terminal, wherein the first value is a value obtained by multiplying the data output from the comparator circuit and sign information of the equalizing coefficient.

14. The equalizer circuit according to claim 13, wherein the equalizer circuit includes n inter-symbol interference removal units configured to remove inter-symbol interference due to past n data, where n is an integer of 2 or more, each of the inter-symbol interference removal units includes a corresponding latch circuit, a corresponding digital/analog converter circuit, and a corresponding switch circuit, and the latch circuits included in the n inter-symbol interference removal units are connected in series and constituted as a shift register for storing data of symbols up to n-th previous data.

15. The equalizer circuit according to claim 13, wherein the fourth signal is a fourth current signal, and the digital/analog converter circuit is a current DAC.

16. A receiver circuit comprising:

the equalizer circuit according to claim 13;

a demultiplexer configured to receive data output from the equalizer circuit, perform a serial/parallel conversion, and output received parallel data accompanied with a receive clock; and a clock generation circuit configured to generate a data sampling clock used in the equalizer circuit base on an output signal of the demultiplexer.

17. An integrated circuit device comprising:

the receiver circuit according to claim 16;

an internal circuit configured to receive the received parallel data and the receive clock from the receiver circuit, and perform processing; and a transmitter circuit configured to receive transmit parallel data and a transmit clock from the internal circuit, perform a parallel/serial conversion, and output a serial converted transmit signal.

* * * * *